United States Patent [19]

Nakagawa

[11] Patent Number: 4,503,820

[45] Date of Patent: Mar. 12, 1985

[54] FUEL INJECTION QUANTITY SENSING APPARATUS FOR AN INTERNAL COMBUSTION ENGINE

[75] Inventor: Toyoaki Nakagawa, Yokosuka, Japan

[73] Assignee: Nissan Motor Company, Limited, Kanagawa, Japan

[21] Appl. No.: 436,414

[22] Filed: Oct. 25, 1982

[30] Foreign Application Priority Data

Nov. 5, 1981 [JP] Japan ............... 56-176462

[51] Int. Cl.³ ............... F02D 1/04; F02D 1/06
[52] U.S. Cl. ............... 123/357; 123/501; 123/446; 123/387; 123/494; 73/119 A
[58] Field of Search ............... 123/446, 612, 387, 357, 123/457, 501, 502, 494; 73/119 A

[56] References Cited

U.S. PATENT DOCUMENTS

| | | | |
|---|---|---|---|
| 4,012,948 | 3/1977 | Kuno | 73/119 A |
| 4,064,855 | 12/1977 | Johnson | 123/457 |
| 4,066,059 | 1/1978 | Mayer | 123/612 |
| 4,136,558 | 1/1979 | Lukes | 73/119 A |
| 4,187,720 | 2/1980 | Baker | 73/119 A |
| 4,200,075 | 4/1980 | Takahashi | 123/385 |
| 4,337,650 | 7/1982 | Brandt | 73/119 A |

OTHER PUBLICATIONS

"Electronic Control of Diesel Passenger Cars", by Hermann Eisele—Society of Automotive Engineers, Inc.-Technical Paper Series, Feb. 25-29, 1980.

*Primary Examiner*—Ronald B. Cox
*Attorney, Agent, or Firm*—Lowe, King, Price & Becker

[57] ABSTRACT

A piezoelectric sensor produces a first signal indicative of the pressure of fuel in a working chamber defined by the plunger housing and the inner end of a fuel distributing plunger reciprocating through the plunger housing. A threshold discriminator responds to the signal and produces a second signal indicative of the interval during which the first signal exceeds a fixed level. A counter counts clock pulses in the presence of the second signal and outputs its count value to a calculating unit which calculates a fuel injection quantity on the basis of the count value and engine speed sensed in accordance with the desired relationship amount count value, engine speed and fuel injection quantity.

4 Claims, 4 Drawing Figures

FUEL INJECTION QUANTITY SENSING APPARATUS FOR AN INTERNAL COMBUSTION ENGINE

BACKGROUND OF THE INVENTION

The present invention relates to a fuel injection internal combustion engine, and more particularly to apparatus for sensing fuel injection quantity as a parameter indicative of the load on an engine of this kind.

It is well known that it is necessary to know engine speed and fuel injection quantity in order to know the load on an engine of this kind. A conventional fuel injection quantity sensing apparatus described in SAE 800167 includes a non-contact displacement meter or a piezoelectric element which senses the displacement or lift of a needle valve of the fuel injector fixed in the combustion chamber of the engine to supply its output to a waveform processing unit. This waveform processing unit outputs a pulse signal, the pulse width of which indicates the duration during which the needle valve is in the lifted position. The pulse signal and clock pulses from a clock pulse generator are supplied to a counter to count clock pulses while the pulse signal is at high level to determine a fuel injection duration. This determined fuel injection duration and engine speed are supplied to a calculating unit to calculate fuel quantity per injection in accordance with a desired relationship among engine speed, fuel injection period and quantity.

With this apparatus, when contaminants in the fuel are deposited on the needle valve and the nozzle and block the nozzle, the relationship between fuel injection duration and quantity may deviate greatly from the desired relationship and errors in the detection of fuel injection quantity increase.

Another conventional approach is to calculate a fuel injection quantity from the position of a control lever of a fuel injection pump. This method has the advantage of being almost unaffected by the blocking of the nozzle. However, since fuel injection quantities in different engines differ from one another due to the combined errors involved in the manufacturing and assembling of the corresponding governors and in the adjustment thereof, this technique will not achieve the desired detection accuracy of fuel injection quantity without checking for the respective relationships between the positions of the lever and the actual fuel injection quantity.

The present invention intends to eliminate the above drawbacks of the conventional detecting apparatus.

SUMMARY OF THE INVENTION

The present invention provides a fuel injection sensing apparatus for an internal combustion engine which includes means for sensing the pressure of fuel in a working space in the fuel injection pump and means for sensing engine speed. The apparatus further includes means for calculating a fuel injection quantity in accordance with the sensed plunger chamber pressure and engine speed.

According to the present invention, errors in sensing of fuel injection quantity due to blocking of the fuel nozzle and unequalities in the operational characteristics of the respective nozzles are reduced, so that the accuracy of the fuel injection quantity apparatus can easily be confirmed.

BRIEF DESCRIPTION OF THE ACCOMPANYING DRAWINGS

DETAILED DESCRIPTION OF THE PREFERRED EMBODIMENT

Figure 1:
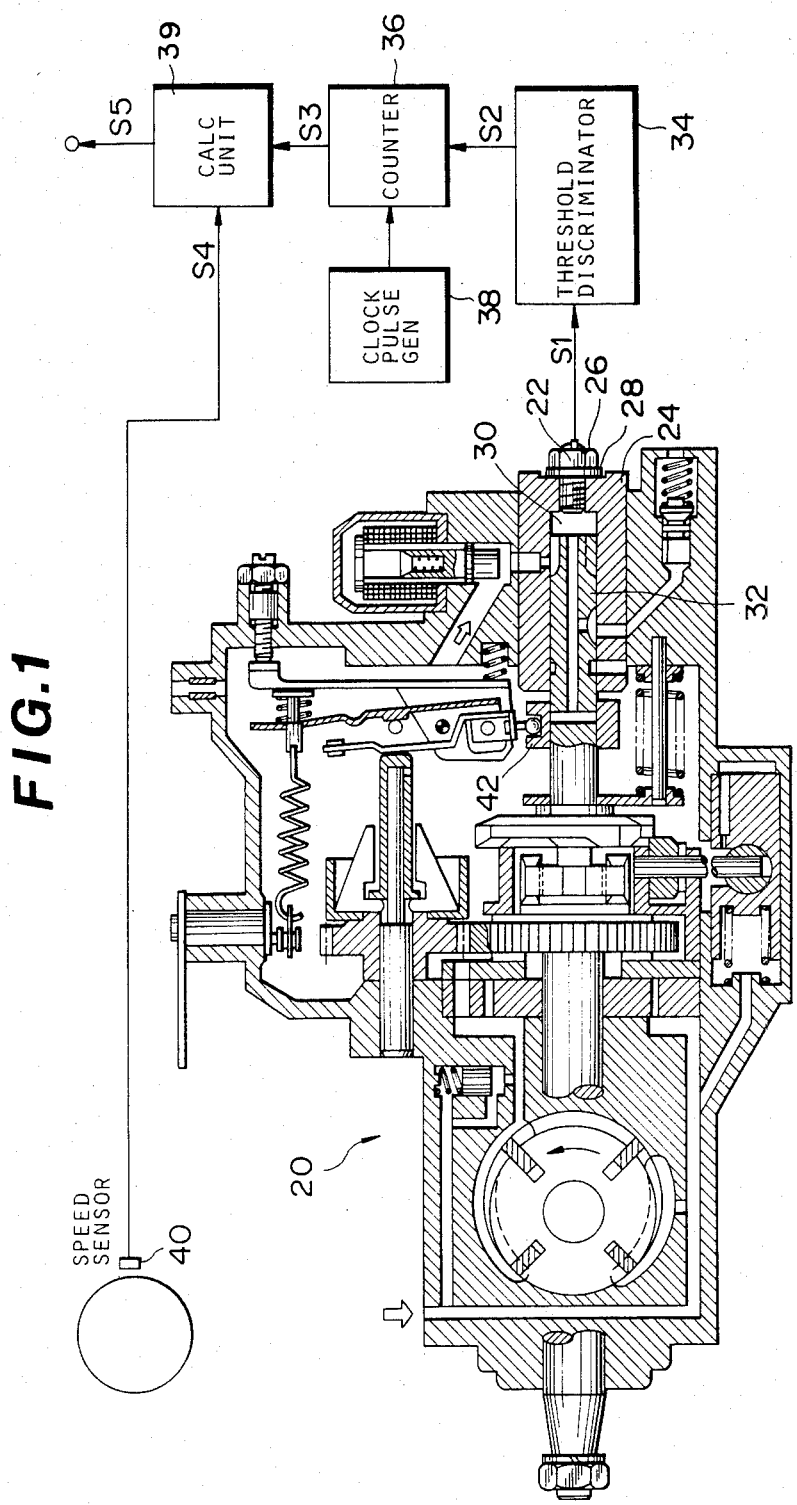
FIG. 1 is is a block diagram of a preferred embodiment of a fuel injection quantity sensing apparatus associated with a fuel injection pump.

Referring to FIG. 1, there is shown a conventional type VE fuel injection pump 20 such as disclosed in ASME publication 78-DGP-7, page 1 et seq, associated with a fuel injection quantity sensing apparatus according to the present invention. The description of the operation of pump 20 will be omitted because it is well known.

Figure 2:
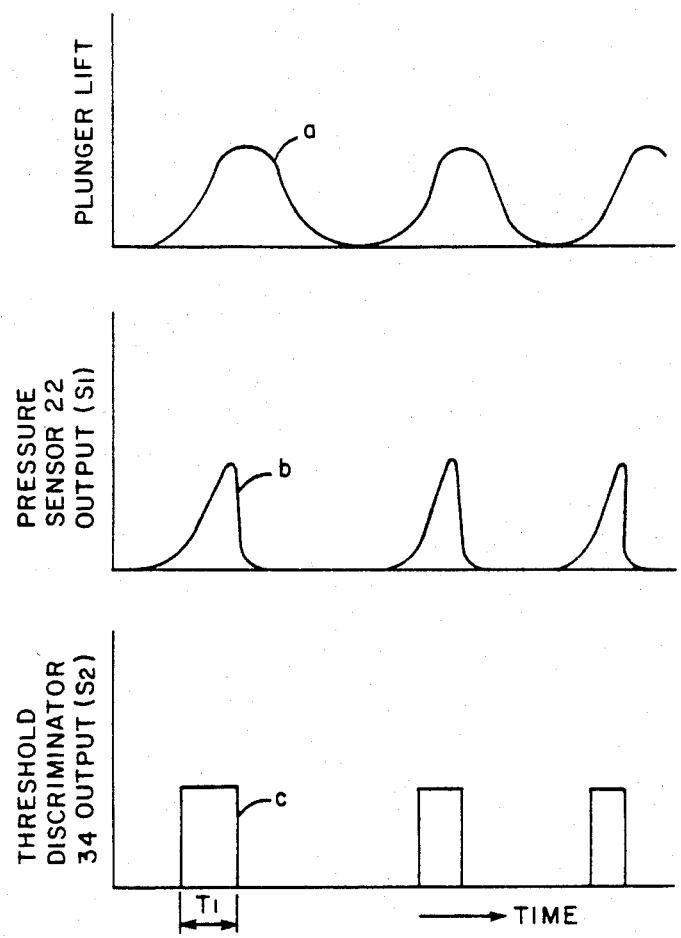
FIG. 2 shows the lift of a plunger, and the outputs of pressure sensor and threshold discriminator.
Figure 3:
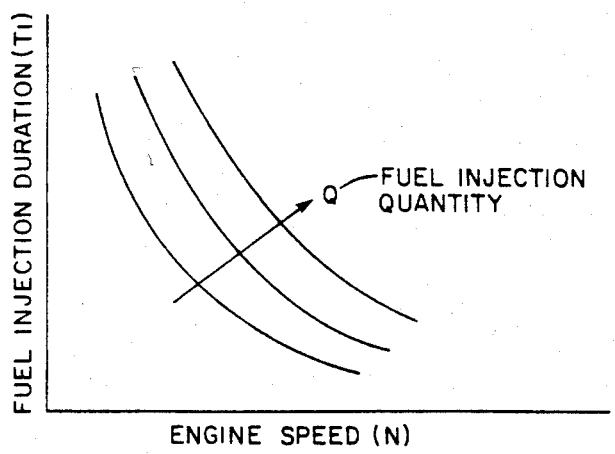
FIG. 3 is a graph of the relationship among compression duration of plunger, engine speed and fuel injection quantity.

A pressure sensor 22, including a piezoelectric element, is secured in a plunger housing 24 by a nut 26 via a washer 28 so as to sense the pressure, which changes as shown by a in FIG. 2, in a working chamber 30 defined by plunger housing 24 and a reciprocal fuel distributing plunger 32 inserted therein. The output $S_1$ of sensor 22 is supplied to a threshold discriminator 34 which supplies to a counter 36 a pulse signal $S_2$, the pulse width $T_1$ of which indicates the interval during which the pressure in working space 30 is above a predetermined value. The interval $T_1$ also indicates a fuel injection duration during which fuel is forced out by plunger 32. Counter 36 counts the pulses of a clock pulse signal from a clock pulse generator 38 during the width T of the pulse $S_2$ and outputs its count value $S_3$, indicative of fuel injection duration, to a calculating unit 39. This calculating unit calculates a fuel injection quantity on the basis of the count value $S_3$ and a signal $S_4$, indicative of engine speed N from an engine speed sensor 40 in accordance with the relationship among engine speed, fuel injection quantity and duration as shown in FIG. 3 and outputs a signal $S_5$ indicative of fuel injection quantity Q. Reference numeral 42 denotes a control sleeve for adjusting the fuel injection quantity.

Even if the injection nozzle, not shown, may be blocked by contaminants in the fuel, the fuel driving mechanism will operate without being influenced by that factor so that errors in detection accuracy due to the blockage of the nozzle is negligible. Accordingly, compared to the conventional fuel injection sensing apparatus utilizing nozzle lift, the apparatus according to the present invention provides an improved sensing accuracy as well as a reduction in discrepancies due to the characteristics of different fuel injection nozzles.

Figure 4:
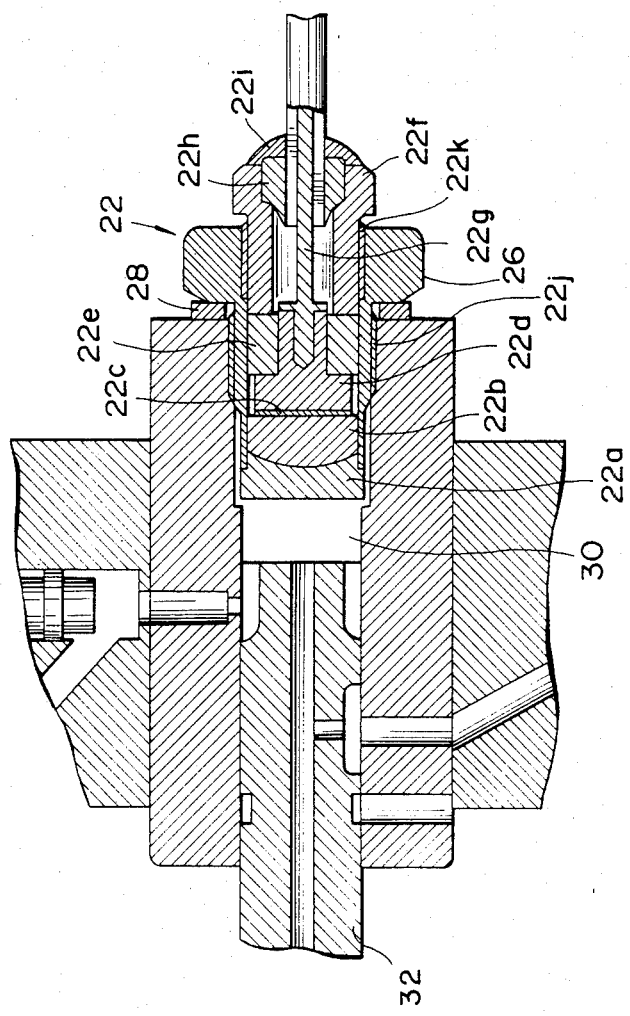
FIG. 4 is a cross-sectional view of the pressure sensor used in the sensing apparatus according to the present invention.

Referring to FIG. 4, the detailed structure of pressure sensor 22 is shown. A pressure-responsive member 22a disposed in working chamber 30 so as to oppose the inner end of plunger 32 is provided on its back with a thin piezoelectric element 22c via an electrically conductive pressure transmitting member 22b. Piezoelectric element 22c is provided on its back with an electrode 22d which is attached via an insulator 22e to a sleeve 22f. A nut 26 has a hollow cylindrical portion covering and securing members 22a, 22b, 22c, 22d, 22e and 22f in an aligned relationship and is engaged by means of threads at 22j and 22k with plunger housing 24 and sleeve 22f. The piezoelectric element 22c is grounded at one end to plunger housing 24. A lead 22g connected to electrode 22d is guided through sleeve 22f and a supporting member 22h disposed at the free end of sleeve 22f. Thus, changes in the pressure in working chamber 30 are transmitted via pressure-responsive member 22a, pressure transmitting member 22b to piezoelectric element 22c, the strain of which is transduced to a voltage signal outputted via lead 22g. Reference numeral 22i is a securing member which is used to prevent supporting member 22h from slipping away from sleeve 22f.

In the above embodiment, the pressure in working chamber 30 is sensed by piezoelectric element 22c, the output of which is truncated at a fixed voltage level, and the duration during which the piezoelectric element output exceeds the fixed level is used as a fuel injection duration. However, the absolute value of the pressure in the working space may also be sensed and used as a fuel injection duration.

While the present invention has been described and shown in terms of a preferred embodiment thereof, it should be noted that the present invention is not limited to the embodiment. Various changes and modifications could be made by those skilled in the art without departing the scope of the present invention as set forth in the claims.

What is claimed is:

1. A fuel injection quantity sensing apparatus for an internal combustion engine, comprising:
    (a) pressure sensing means for sensing the pressure of fuel in a working space defined by a housing and one end of a fuel distributing plunger reciprocating within the housing;
    (b) speed sensing means for sensing engine speed; and
    (c) calculating means for calculating a fuel injection quantity in accordance with the sensed pressure and engine speed,
    said pressure sensing means comprising:
        a piezoelectric member disposed in a working space defined by a housing and a fuel-distributing plunger reciprocating within the housing for transducing mechanical pressure to an electrical signal,
        an electrically conductive member exposed to said working space and contacting a surface of said piezoelectric member for transmitting the pressure of fuel in said working space to said piezoelectric member,
        an electrode contacting a surface of said piezoelectric member remote from the surface of said piezoelectric member contacting said electrically conductive member,
        a hollow cylindrical member having a portion inserted into said housing and supporting said piezoelectric member, said electrically conductive member and said electrode, said electrically conductive member and said electrode being supplied in mutual electrical isolation.

2. The apparatus of claim 1, further including means for outputting a signal indicative of the sensed pressure to the calculating means during the time when the sensed pressure exceeds a fixed level.

3. The apparatus of claim 2, further including a clock pulse generator and a counter responsive to the signal for counting clock pulses from the clock pulse generator during the presence of the signal and outputting the counted value indicative of the sensed pressure to the calculating means.

4. The apparatus of claim 2 wherein said means for outputting a signal comprises:
    a threshold discriminator connected for receiving a signal generated by said pressure sensing means,
    a clock pulse generator outputting a clock pulse signal, and
    a counter means for counting clock pulses output by said clock pulse generator, said counter means connected to said threshold discriminator for counting said clock pulse signal only when said signal indicative of sensed pressure is output to indicate that the sensed pressure exceeds said fixed level.

* * * * *